Feb. 23, 1971     D. A. G. WALMSLEY     3,565,962
PRODUCTION OF A POLYCYCLIC DIENE
Filed Oct. 27, 1969
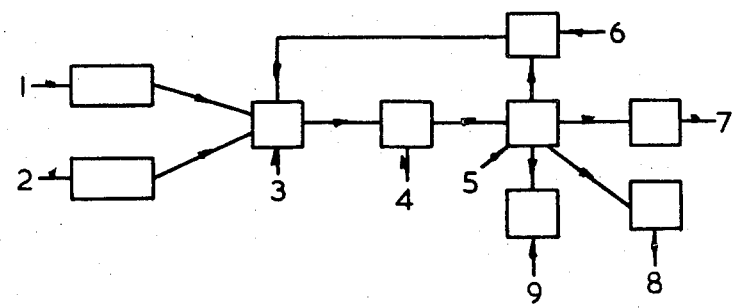
INVENTOR
DAVID ARTHUR GREGSON WALMSLEY
BY
Cushman, Darby & Cushman
ATTORNEYS

United States Patent Office 3,565,962
Patented Feb. 23, 1971

3,565,962
PRODUCTION OF A POLYCYCLIC DIENE
David Arthur Gregson Walmsley, Runcorn, England, assignor to Imperial Chemical Industries Limited, London, England, a corporation of Great Britain
Filed Oct. 27, 1969, Ser. No. 869,779
Claims priority, application Great Britain, Nov. 11, 1968, 53,340/68
Int. Cl. C07c 3/00
U.S. Cl. 260—666
9 Claims

ABSTRACT OF THE DISCLOSURE

A process for the production of 6-methyl-1,4,5,8,9,10-hexahydro-1,4-methanonaphthalene by Diels-Alder reaction of norbornadiene and isoprene in which norbornadiene and isoprene are reacted in a molar proportion of greater than 4:3, and preferably not greater than 20:1, and unreacted norbornadiene, which may, if desired, by continuously recycled, and 6-methyl-1,4,5,8,9,10-hexahydro-1,4-methanonaphthalene are separately recovered from the mixture.

---

This invention relates to an improved method of preparing the compound identified as 6-methyl-1,4,5,8,9,10-hexahydro-1,4-methanonaphthalene in accordance with the nomenclature defined on page C51 of the Handbook of Chemistry and Physics, 46th Edition 1965–1966, published by the Chemical Rubber Company. Thus, the compound referred to above, which is identified hereinafter as EMHN for simplicity, has the structure I.

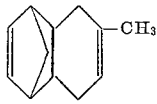

I

It is of value as a polycyclic diene which may readily be copolymerised with ethylene and another α-olefin, e.g. propylene, without undue formation of insoluble gel through premature cross-linking to yield polymeric products which may speedily be vulcanised to elastomers having good tensile properties.

EMHN may be prepared by reacting norbornadiene and isoprene under Diels-Alder reaction conditions. The maximum yield based on the total amount of starting materials is obtained when approximately equimolar proportions of norbornadiene and isoprene are used. We have now found, however, that a substantial proportion of the norbornadiene which has not reacted may be recovered from the mixture after reaction, e.g. by distillation, whereas little, if any, isoprene is recoverable. The isoprene which does not react with norbornadiene is lost, for example, in the formation of isoprene dimers and by further reaction with EMHN.

We have also found, surprisingly, that a better utilisation of starting materials may be obtained if the reaction is effected at a molar proportion of norbornadiene to isoprene which is other than 1:1, and specifically is greater than 4:3. In particular we have found that the actual yield of EMHN, expressed as a proportion of the total amount of norbornadiene and isoprene which have reacted and as a proportion of the maximum theoretical yield, increases with increase in the molar proportion of norbornadiene to isoprene used in the reaction mixture. Moreover, with increase in the aforementioned molar proportion, the proportion of undesirable by-products, e.g. isoprene dimers, products of reaction of EMHN with isoprene and resinous oligomeric and polymeric products in the product mixture may be decreased. Furthermore, the proportion of norbornadiene which is lost through by-product formation may also be decreased.

According to the present invention, therefore, there is provided a process for the production of 6-methyl-1,4,5,8,9,10-hexahydro-1,4-methanonaphthalene (EMHN) by Diels-Alder reaction of norbornadiene and isoprene, in which norbornadiene and isoprene are reacted in a molar proportion greater than 4:3 and 6-methyl-1,4,5,8,9,10-hexahydro-1,4-methanonaphthalene and unreacted norbornadiene are separately recovered from the mixture.

The process may be operated continuously if desired and in accordance with this embodiment the process comprises the steps of (a) continuously metering norbornadiene and isoprene into a reaction zone at a molar proportion of greater than 4:3,
(b) continuously reacting the norbornadiene with the isoprene in said reaction zone,
(c) continuously and separately recovering EMHN and unreacted norbornadiene from the mixture recovered from the reaction zone, and
(d) recycling the unreacted norbornadiene.

It is preferred that the molar proportion of norbornadiene to isoprene in the reaction mixture be not greater than 20:1, and preferably not greater than 10:1, as at this latter ratio the advantages of our invention are substantially fully realised, in particular substantially all the norbornadiene which does not react to form EMHN is recoverable. In order to avoid recovering large amounts of unreacted norbornadiene it is further preferred that the molar proportion of norbornadiene is isoprene in the reaction mixture be in the range 2:1 to 5:1.

The composition to be used in the initial reaction mixture will depend on a number of factors, e.g. the desirability of producing a high yield of EMHN relative to the yield of by-products and the necessity of separating and recycling unused norbornadiene in order to achieve a high overall utilisation of norbornadiene. For example, if a high yield of EMHN relative to the by-products is desired, a high proportion of norbornadiene to isoprene should be used in the reaction mixture, whereas a lower proportion should be used if it is more preferable to avoid recycling large amounts of unreacted norbornadiene. The proportion to be chosen in the reaction mixture may be determined with the aid of the examples set out at the end of this specification.

Reaction within an economic time requires the utilisation of elevated temperatures and pressures. Temperatures above 250° C. are preferably avoided as, however, norbornadiene tends to degrade thermally under forcing conditions. On the other hand, it is generally found that the use of temperatures below 120° C. results in very low rates of reaction and low ultimate yields of the desired product. We have found that preferred temperatures of reaction at autogenous pressure are from 140 to 250° C. and more preferably 160 to 180° C.

Generally, it is most convenient to effect the reaction under the autogenous pressure of the reactants, for example in an autoclave or (in the case of the continuous process) in a tubular reactor. However, we do not exclude the use of pressures higher or lower than the autogenous pressure of the reactants. Pressures of 10 to 35 atmospheres or more are generally suitable.

Reaction times of the order of several hours may be required in the batch process to obtain high yields and the dwell times in the continuous process will be of corresponding order. When norbornadiene and isoprene are reacted at 140° C. under autogenous pressure a time of at least 15 hours, and usually 20 hours, is generally required for useful yields, lower times being acceptable at higher temperatures.

However, in effecting the process of our invention, it may be desirable to achieve a balance between the conversion of norbornadiene to a high yield of EMHN, and the production of a low yield of by-product. It may thus be economically undesirable to set the conditions of the reaction to achieve the maximum possible yield of EMHN from the particular initial proportion of norbornadiene to isoprene used, especially if, as a consequence, undesirably high yields of the by-products are produced. Thus, it may be preferred to separate the EMHN before reaction between the norbornadiene and isoprene has proceeded to completion. However, in order to produce useful yields of EMHN reaction between norbornadiene and isoprene will generally be continued for at least 1 hour. On the other hand, there may be no advantage in continuing the reaction for a period of greater than 30 hours.

The reaction is preferably effected in the substantial absence of air and moisture as both tend to interfere with it. Catalysts for the Diels-Alder reaction and/or polymerisation inhibitors may be used if desired.

The EMHN may be separated from unreacted material and by-products by distillation or other suitable technique. Alternatively, it may be used in further chemical processes together with the unreacted material and by-products where these merely act as a diluent for the further processes. However, where the EMHN is to be co-polymerised with ethylene and another $\alpha$-olefin, e.g. propylene, it is preferably separated from unreacted material and by-products before use in copolymerisation. We have found that where the molar proportion of norbornadiene to isoprene in the reaction mixture is progressively increased it becomes progressively easier to separate the EMHN in a substantially pure form by relatively simple techniques, e.g. simple fractional distillation.

One method of operating the process continuously is now described in more detail and with the aid of the accompanying drawing in which 1 and 2 represent reservoirs for the storage of norbornadiene and isoprene respectively, 4 is a reaction vessel, e.g. a tubular reactor, to which the reagents are fed from the reservoirs via flow-meters F1 and F2, and if desired via a mixer 3. 5 is a distillation unit or a plurality of distillation units to which the product from the reactor is fed, and 6, 7, 8, 9, and 10 represent the various fractions obtained from the distillation. 6 is unreacted norbornadiene which is recycled as shown. 7 is a fraction which may contain some EMHN product. 8 is a main fraction of EMHN product. 9 is any remaining distillable by-product and 10 is any residual oligomeric or polymeric by-product.

In operation, norbornadiene and isoprene are metered from the reservoirs 1 and 2 to the reaction vessel 4 via mixer 3 at a molar proportion of greater than 4:3, preferably between 2:1 and 5:1. The reaction vessel is preferably a tubular reactor at a temperature of e.g. from 140° C. to 250° C. and operating under the autogenous pressure of the reactants. The rate of passage of the reactants through the reaction vessel and/or the length of the reactor is, or are arranged to provide a dwell time of preferably from 1 to 30 hours. The product of the reaction is fed to the distillation unit or units 5 from which five fractions may be obtained. The first, boiling at e.g. 80° C. to 100° C. at atmospheric pressure contains unreacted norbornadiene which is collected and recycled to the input side of the flow-meter F1 as shown and thence to the reactor. The second, boiling at e.g. 75° C. to 85° C. and 9 mm. of Hg pressure, contains isoprene dimers and some EMHN. The third boiling at e.g. 85° C. to 90° C. at 9 mm. of Hg pressure is the desired EMHN product which may be collected and, if necessary, further purified before use by later processing stages not shown. The fourth is any remaining distillable by-product which may be discarded or worked up to recover any desirable components e.g. traces of EMHN. The fifth is any residual oligomeric or polymeric by-product which will usually be discarded.

The invention is now illustrated with the aid of the accompaning examples in which all parts are expressed as parts by weight.

EXAMPLE 1

644 parts of norbornadiene and 47.6 parts of isoprene (i.e., a molar proportion of norbornadiene:isoprene of 10:1) were charged to a dry sealable pressure vessel which had previously been flushed four times with nitrogen in order to remove air. The space above the hydrocarbon mixture was again flushed with nitrogen and the vessel was sealed and heated to 170° C. for 15 hours under the autogeneous pressure generated by the contents. At the end of the reaction the vessel was opened and 672.8 parts of the contents were charged to a distillation apparatus and distilled at atmospheric pressure through a vacuum-jacketed fractionating column packed with glass helices. The distillation apparatus was fitted with a still head for take off of distillate. 566.4 parts of a fraction boiling within the temperature range 79° C. to 178° C. (mainly 92° C.) at atmospheric pressure was recovered and by analysis on a 12 ft. 15% Apiezon column in a Perkin-Elmer F11 gas liquid chromatography machine was shown to comprise 99.9% of norbornadiene. This fraction was suitable for reuse in further reaction with isoprene. The distillation was continued and 5.74 parts of a fraction boiling with the temperature range 78° C. to 86° C. as 9 mm. of Hg pressure was collected and shown by analysis as above to contain 76.9% of EMHN and 18.3% of isoprene dimers. 56.35 parts of a further fraction boiling within the temperature range 86° C. to 89° C. at 9 mm. of Hg pressure was shown by analysis to contain 99% of EMHN. A further 44.2 parts of resinous product remained undistilled. The results are shown in Table I.

EXAMPLE 2

The procedure of Example 1 was repeated except that 146.2 parts of the norbornadiene and 27.3 parts of isoprene (i.e. a molar proportion of norbornadiene:isoprene of 4:1) were used. At the end of the reaction 167.0 parts of the contents of the vessel were distilled and the following fractions collected; 109.6 parts of a fraction boiling within the temperature range 48° C. to 92° C. (mainly 89° C.) at atmospheric pressure and containing 99% of norbornadiene with a trace of isoprene and suitable for reuse in further reaction with isoprene. 2.92 parts of a fraction boiling within the temperature range 68° C. to 82° C. at 14.5 mm. of Hg pressure and containing 11.4% of EMHN, 9.6% of norbornadiene and 79% of isoprene dimers, 27.21 parts of a fraction boiling within the temperature range 82° C. to 102° C. (mainly 101° C.) at 16 mm. of Hg pressure and containing 93% of EMHN and 7% of isoprene dimers, and 8.14 parts of a fraction boiling within the temperature range 110° C. to 220° C. at 16 mm. of Hg pressure and containing 84% of EMHN. 19.08 gm. of resinous proudct remained undistilled. The results are shown in Table I.

EXAMPLE 3

The procedure of Example 1 was repeated except that 137.2 parts of norbornadiene and 34.1 parts of isoprene (i.e. a molar proportion of 3:1) were used. The product of reaction was distilled and analysed and the results are shown in Table I.

EXAMPLE 4

The procedure of Example 1 was repeated except that 120 parts of norbornadiene and 46.4 parts of isoprene (i.e. a molar proportion of 2:1) were used. The results of the analysis of the distilled product are shown in Table I.

By way of comparison the procedure of Example 1 was repeated except that 91.8 parts of norbornadiene and 68.1 parts of isoprene (i.e. a molar proportion of 1:1) and 61 parts of norbornadiene and 90.6 parts of isoprene (i.e. a molar proportion of 1:2) were used respectively in comparative Example A and in comparative Example B (see Table I).

a proportion of the maximum possible yield, whereas the proportion of recoverable norbornadiene decreased significantly.

TABLE I

| | Charges into pressure vessel | | | Percent yield of EMHN as a proportion of the norbornadiene and isoprene which have reacted [1] | Percent yield of EMHN as a proportion of the maximum possible yield | Proportion of norbornadiene recovered [2] |
|---|---|---|---|---|---|---|
| | Part by weight norbornadiene | Parts by weight isoprene | Molar proportion norbornadiene: isoprene | | | |
| Example: | | | | | | |
| 1 | 644 | 47.6 | 10:1 | 57.1 | 55.8 | Ca. 100 |
| 2 | 146.2 | 27.3 | 4:1 | 57.2 | 52.6 | 89 |
| 3 | 137.2 | 34.1 | 3:1 | 56.4 | 48.3 | 88.5 |
| 4 | 120 | 46.4 | 2:1 | 54.7 | 43.1 | 82.6 |
| Comparative: | | | | | | |
| A | 91.8 | 68.1 | 1:1 | 46.8 | 29.5 | 86.2 |
| B | 61 | 90.6 | 1:2 | 23.6 | 27.8 | 79.6 |

[1] Expressed as a proportion of product recovered from the reaction vessel less unreacted starting materials.
[2] Norbornadiene recovered by distillation expressed as a percent of the norbornadiene charged to the pressure vessel less that which has reacted with isoprene to form EMHN.

EXAMPLE 5

The procedure of Example 1 was repeated except that 149.8 parts of norbornadiene and 22.5 parts of isoprene (i.e. a molar proportion of 5:1) were used. At the end of the reaction 169.8 parts of the contents of the vessel were distilled and the following fractions collected; 1.81 parts of a fraction boiling within the temperature range 34° C. to 76° C. at atmospheric pressure and containing 67.2% of isoprene and 32.8% of norbornadiene, 126 parts of a fraction boiling within the temperature range 76° C. to 110° C. (mainly 92° C.) at atmospheric pressure and containing 95.4% of norbornadiene, 1.24 parts of a fraction boiling within the temperature range 84° C. to 90° C. at 15 mm. of Hg pressure and containing 44.8% of EMHN, 20.18 parts of a fraction boiling within the temperature range 90° C. to 100° C. at 15 mm. of Hg pressure and containing 96.5% of EMHN, and 7.48 parts of a fraction boiling within the temperature range 120° C. to 230° C. at 16 mm. of Hg pressure and containing 45.5% of EMHN. A further resinous product remained undistilled. The yield of EMHN was 48.7% expressed as a proportion of norbornadiene and isoprene which had reacted (i.e. excluding unreacted starting materials) and 44.8% as a proportion of the maximum possible yield. Approximately 100% of the norbornadiene charged to the pressure vessel and which had not reacted to form EMHN was recovered.

EXAMPLE 6

In order to illustrate the effect of variation in reaction temperature the procedure of Example 5 was repeated except that the pressure vessel was heated at a temperature of 150° C. for 15 hours. The product of reaction was distilled and analysed and the yield of EMHN was 37.5% expressed as a proportion of the norbornadiene and isoprene which had reacted and 34% as a proportion of the maximum possible yield. Approximately 100% of the norbornadiene which had not reacted to form EMHN was recovered. Thus, by comparison with Example 5 decrease in reaction temperature resulted in a lower yield of EMHN.

In a further experiment the procedure of Example 5 was repeated except that the pressure vessel was heated at a temperature of 210° C. for 15 hours. The product of reaction was distilled and analysed and the yield of EMHN was 33% expressed as a proportion of the norbornadiene and isoprene which had reacted and 43.8% as a proportion of the maximum possible yield. 85.3% of the norbornadiene which had not reacted to form EMHN was recovered. Thus, by comparison with Example 5, increase in the reaction temperature resulted in an insignificant decrease in the yield of EMHN expressed as

What I claim is:
1. In a process for the production of 6-methyl-1,4,5,8,9,10-hexahydro-1,4-methanonaphthalene by Diels-Alder reaction of norbornadiene and isoprene the improvement which comprises reacting norbornadiene and isoprene in a molar proportion greater than 4:3 and separately recovering from the mixture 6-methyl-1,4,5,8,9,10-hexahydro-1,4-methanonaphthalene and unreacted norbornadiene.

2. A process as claimed in claim 1 in which comprises the steps of
   (a) continuously metering norbornadiene and isoprene into a reaction zone at a molar proportion of greater than 4:3,
   (b) continuously reacting the norbornadiene with the isoprene in said reaction zone,
   (c) continuously and separately recovering 6-methyl-1,4,5,8,9,10-hexahydro - 1,4 - methanonaphthalene and unreacted norbornadiene from the mixture recovered from the reaction zone, and
   (d) recycling the unreacted norbornadiene.

3. A process as claimed in claim 1 in which the molar proportion of norbornadiene to isoprene is not greater than 20:1.

4. A process as claimed in claim 1 in which the molar proportion of norbornadiene to isoprene is not greater than 10:1.

5. A process as claimed in claim 1 in which the molar proportion of norbornadiene to isoprene is in the range 2:1 to 5:1.

6. A process as claimed in claim 1 in which norbornadiene and isoprene are reacted at a temperature within the range 140° C. to 250° C.

7. A process as claimed in claim 6 in which the temperature is within the range 160° C. to 180° C.

8. A process as claimed in claim 1 in which the reaction is effected at a pressure of from 10 to 35 atmospheres.

9. A process as claimed in claim 1 in which the reaction is effected for a time within the range 1 hour to 30 hours.

References Cited

UNITED STATES PATENTS

| | | | |
|---|---|---|---|
| 3,144,491 | 8/1964 | O'Connor et al. | 260—666 |
| 3,235,614 | 2/1966 | Fritz et al. | 260—666 |
| 3,345,419 | 10/1967 | Tinsley et al. | 260—666 |

FOREIGN PATENTS

| | | | |
|---|---|---|---|
| 884,869 | 4/1969 | Japan | 260—666 |

DELBERT E. GANTZ, Primary Examiner

V. O'KEEFE, Assistant Examiner